Oct. 25, 1932.  F. W. PERRY  1,884,192
LIFT FOR AUTOMOTIVE VEHICLES
Filed Nov. 1, 1929   2 Sheets-Sheet 1
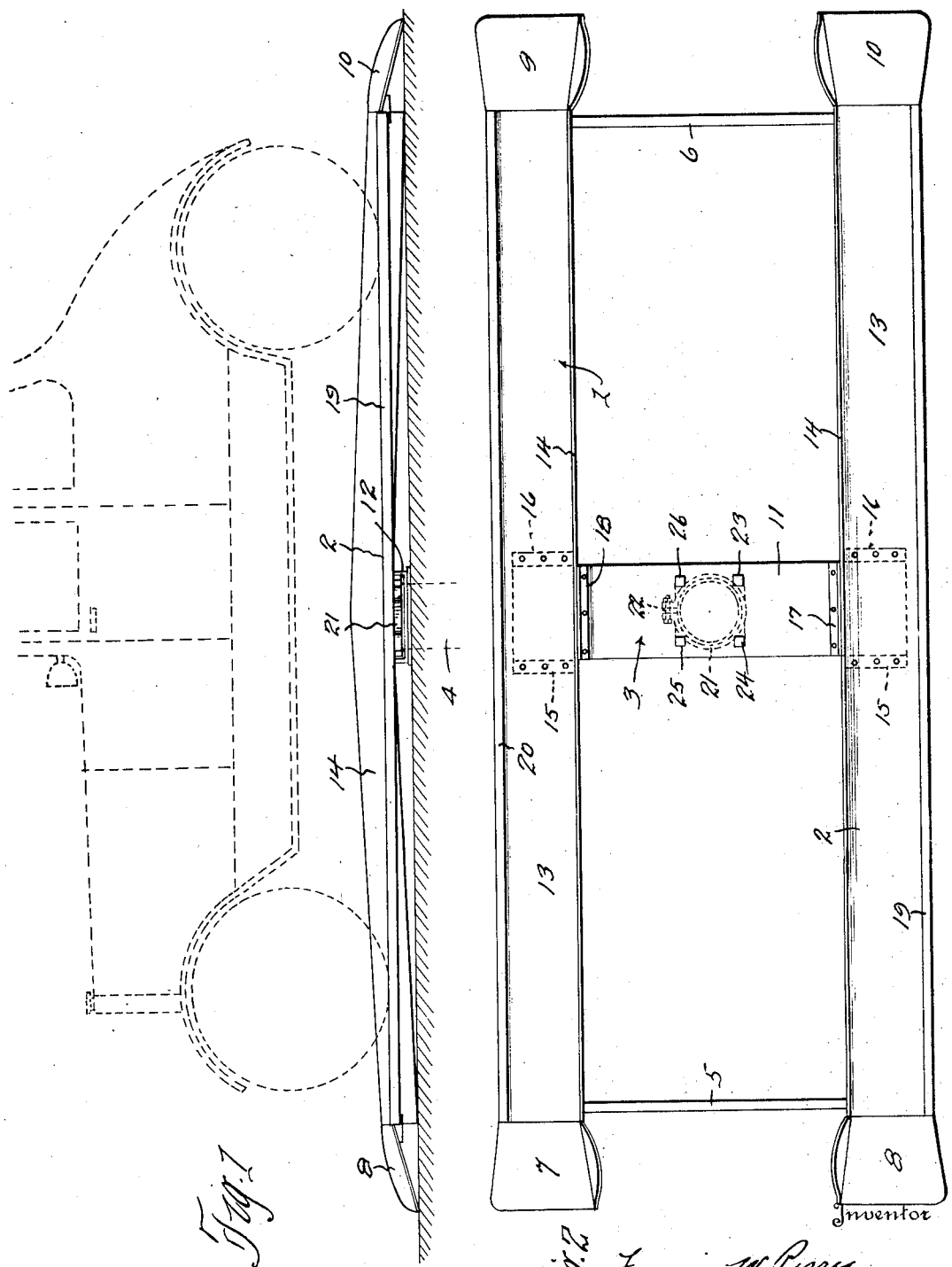

Oct. 25, 1932.    F. W. PERRY    1,884,192
LIFT FOR AUTOMOTIVE VEHICLES
Filed Nov. 1, 1929    2 Sheets-Sheet 2
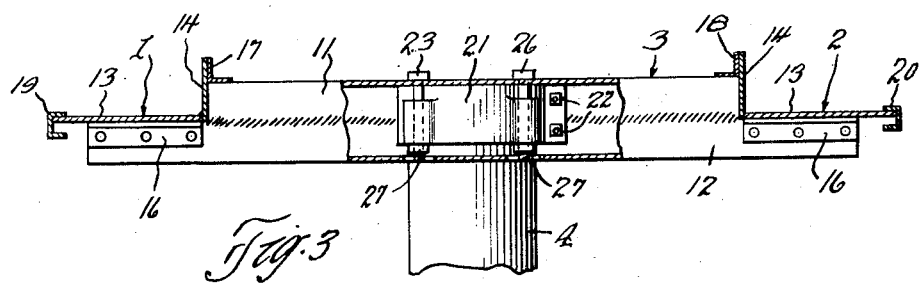
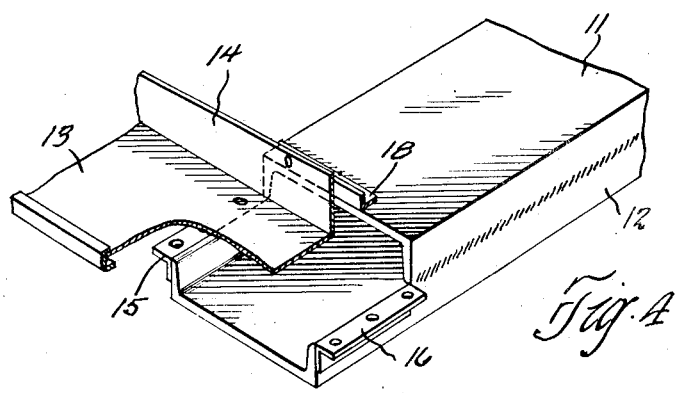
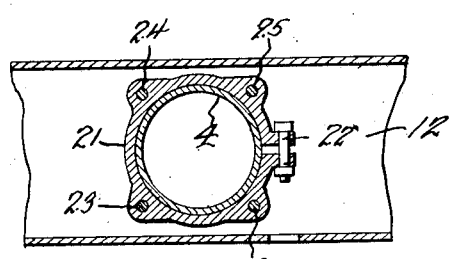

Patented Oct. 25, 1932

1,884,192

UNITED STATES PATENT OFFICE

FRANCIS W. PERRY, OF PITTSBURGH, PENNSYLVANIA, ASSIGNOR, BY MESNE ASSIGNMENTS, TO EDWIN L. WIEGAND, OF PITTSBURGH, PENNSYLVANIA

LIFT FOR AUTOMOTIVE VEHICLES

Application filed November 1, 1929. Serial No. 404,006.

This invention relates to a lifting device primarily adapted for lifting automotive vehicles from a position adjacent the ground or floor level to an elevated position and is especially adapted for use in connection with automobile service stations and garages where it is desirable to gain access to the under-rigging of the vehicle. Devices of this kind are known to those skilled in the art as lifts and the main object of this invention is to provide a lift of the character described which is strong and rigid in construction, comprises few parts and is well adapted for production at a minimum cost.

The main object of the invention is to provide a lift of the character described in which the runways or tracks on which the vehicle is supported are supported on the supporting column in a very simple and efficient manner without shearing or stretching strains on the assembly bolts.

Further and more limited objects of the invention will appear as the description proceeds and by reference to the accompanying drawings in which Fig. 1 is a view in side elevation of my improved lift and disclosing an automobile resting on the runways;

Fig. 2 is a top plan view of the lift;

Fig. 3 is a view partly in vertical section and partly in side elevation of the cross head for securing the runways to the supporting column;

Fig. 4 is a perspective view with parts broken away illustrating the manner of securing the runways to the cross head; and Fig. 5 is a fragmentary horizontal sectional view disclosing the head casting for securing the cross head to the supporting column.

Referring now to the drawings, the lift consists essentially of a pair of runways 1 and 2 which are connected by a cross head 3 which is mounted on a supporting column or cylinder 4. The pair of runways may be reinforced by suitable spacers or struts 5 and 6, if desired. The ends of the runways 1 and 2 are provided with ramps 7 and 8, 9 and 10 which are preferably hingedly secured to the runways. The mechanism for elevating the lift forms no part of this invention and may be of the type shown in my co-pending application, Serial No. 256,848, filed February 25, 1929 for power lift for vehicles.

The cross head 3 consists of a pair of channels 11 and 12 which are inverted one over the other as shown most clearly in Figs. 3 and 4 and secured together along their opposite edges, preferably by being welded. The lowermost channel 12 extends beyond the channel 11 a considerable distance at the opposite ends thereof, as shown most clearly in Fig. 4. The runways 1 and 2 each consist of a bottom member 13 and to which is welded a side member 14. Secured to the opposite sides of the lowermost channel 12 adjacent the ends thereof are a pair of angle irons 15 and 16. The bottom plates 13 of the runways rest on these angle irons as shown most clearly in Fig. 4 and are preferably secured thereto by means of bolts which pass through suitable openings provided in the angle irons and in the bottom plate. The side walls 14 of the runways are welded to bottom plates 13 and are secured in place by means of angle irons 17 and 18 which are secured to the uppermost channel 12 as shown most clearly in Fig. 4. The angle irons 17 and 18 may be welded to the uppermost channel or may be secured thereto by bolts if desired. The side walls 14 of the runways may also be welded to the angle irons 17, 18, or may be secured thereto by suitable bolts.

Extending along the outer edges of the bottom plates 13 of the runways, are channels 19 and 20 which are preferably welded thereto and extend the full length thereof and serve to reinforce the runways. Disposed between the channels 11 and 12 is a fastening device or head piece 21 which is preferably formed in a single casting and which is adapted to be secured about the upper end of the supporting column 4 and rigidly connected therewith by means of clamping bolts 22. The head casting 21 is provided with apertured lugs or extensions through which extend bolts 23, 24, 25 and 26. These bolts also extend through the uppermost casting 11 and are securely clamped thereto by means of nuts 27. Suitable openings are provided in the lowermost channel 12 so as to provide access to the nuts 27. The lowermost casting 12 is also provided with openings in one side wall thereof to provide access to the clamping bolts 22.

It will be noted that the head casting 21 is rigidly secured to the uppermost channel 11 entirely independent of the lowermost channel 12. This construction enables the cross head to be rigidly and firmly secured to the support column irrespective of any irregularities and imperfections in the two channel members thereby supporting the runways in a horizontal position.

It will now be clear that I have provided a lift which will accomplish the objects of the invention as hereinbefore stated. Various changes may be made in the details of construction as well as in the manner of arranging and securing the various parts in place without departing from the spirit of my invention. It is therefore to be understood that the embodiment of the invention herein disclosed is merely illustrative and is not to be considered in a limiting sense and my invention is limited only in accordance with the scope of the appended claims.

Having thus described my invention, what I claim is:

1. In a lift of the character described, the combination of a pair of runways and a column, a cross head connecting said pair of runways and consisting of a pair of channels disposed one over the other and secured together along their edges, the lowermost channel having an opening therein, a fastening device disposed between said pair of channels and rigidly secured to the uppermost channel and serving to secure said cross head to said column.

2. In a lift of the character described, the combination of a pair of runways and a column and a centrally disposed cross head connecting said pair of runways, said cross head consisting of a pair of channels inverted one over the other and rigidly secured together along their opposite edges, the lowermost channel having an opening therein adapted to receive the upper end of said column therethrough, a head member disposed between said pair of channels and rigidly connected with said upper channel and serving to rigidly connect said cross head with said column.

3. A lift of the character described comprising a pair of runways and a centrally disposed cross head, a supporting column rigidly connected with said cross head, said cross head consisting of a pair of channels inverted one over the other and rigidly secured together along their opposite edges, a head member secured over said column and means rigidly connecting said head member with the uppermost channel, said head member being supported independent of the lower channel.

4. A lift of the character described comprising a pair of runways, a cross head connecting said pair of runways, said cross head consisting of a pair of channels inverted one over the other and secured together along their opposite edges, a head casting disposed between said pair of channels and rigidly secured to the uppermost channel only, the lowermost channel having an opening therein adapted to receive the upper end of a supporting column therethrough and means for securing said head casting to the upper end of the column.

5. A lift of the character described comprising a supporting column, a head piece rigidly secured to the upper end of said supporting column, a pair of runways, a cross head connecting said pair of runways and consisting of a pair of channels inverted one over the other and secured together along their opposite edges, said head piece having a plurality of apertured lugs thereon, a plurality of bolts extending through said uppermost channel and apertured lugs respectively and rigidly connecting said head piece thereto.

6. A lift of the character described comprising a cross head consisting of a pair of channels inverted one over the other and secured together along their opposite edges, the lowermost channel extending beyond the uppermost channel and providing a support for a pair of runways, a pair of runways supported on said lowermost channel, a plurality of angle irons for connecting said runways with said cross head, a head piece disposed between said pair of channels and adapted for connection with a supporting column, means connecting said head piece with the uppermost channel independent of the lowermost channel.

7. In a lift of the character described, a pair of runways, a cross head connecting said pair of runways, a supporting column for supporting the lift, said cross head consisting of a pair of channels inverted one over the other and welded together along their opposite edges, a head piece for securing said cross head to said column, and consisting of a split casting adapted to be clamped over the end of the column, said head piece being disposed between said channels and means independent of said lower channel for securing said head piece to the upper channel.

8. In a lift of the character described, the combination of a pair of runways and a supporting column, a cross head connecting said pair of runways and comprising a pair of channels disposed one over the other, a head piece rigidly secured to said upper channel and to said supporting column.

9. In a lift of the character described, the combination of a pair of runways and a supporting column, a cross head connecting said pair of runways and comprising a pair of channels disposed one over the other, a head piece rigidly secured to one of said pair of channels and serving to secure said cross head to said supporting column.

10. In a lift of the character described, the combination of a pair of runways and a supporting column, a cross head connecting said pair of runways and comprising a pair of channels inverted one over the other and rigidly secured together, a head piece rigidly secured to one of said pair of channels independent of the other channel and serving to secure said cross head to a supporting column.

11. In a lift of the character described, a pair of runways, a cross head connecting said pair of runways, a supporting column for supporting the lift, said cross head consisting of a pair of channels inverted one over the other and welded together along their opposite edges, a head piece for securing said cross head to said column, and consisting of a split casting adapted to be clamped over the end of the column, said head piece being disposed between said channels, and means for securing said head piece to one of said channels independent of the other channel.

12. In a lift of the character described, the combination of a pair of runways and a supporting column, of a crosshead connecting said pair of runways and consisting of a pair of channels inverted one over the other and rigidly connected together, a head piece disposed between said pair of channels and adapted to be secured over the end of said column, and means rigidly connecting said head piece with one of said channels independent of the other channel.

13. In lift apparatus embodying a pair of parallel disposed runways provided along the inner edge with an upstanding flange: a cross-member for supporting the same comprising a box girder having its lower portion projecting at both ends beyond the upper portion thereof for supporting the respective runways, and means to secure said flange to the said upper portion.

14. In lift apparatus embodying a pair of parallel disposed runways provided along the inner edge with an upstanding flange: a cross-member for supporting the same comprising a box girder having its lower portion projecting at both ends beyond the upper channel member for supporting the respective runways, means to secure said flange to the said upper portion, and means to secure the underside of a runway to the said lower portion.

15. In lift apparatus embodying a pair of parallel disposed runways provided along the inner edge with an upstanding flange: a cross-member for supporting the same comprising upper and lower channel members secured along their longitudinal edges to form a box girder, the lower channel member projecting at both ends beyond the upper channel member for supporting the respective runways, and an angle member secured to the outer surface of the upper channel member and to the corresponding flange.

16. In lift apparatus embodying a pair of parallel disposed runways: a cross-member for supporting the same comprising a box girder having its lower portion projecting at both ends beyond the upper portion thereof for supporting the respective runways, a ram having its outer end passing through the lower portion of the girder and abutting the inner surface of the upper portion thereof, a longitudinally split cylinder mounted within the box girder and adapted to receive the outer end of the ram, and means to clamp the same thereto.

In testimony whereof, I hereunto affix my signature.

FRANCIS W. PERRY.